US010727895B1

(12) United States Patent
Nguyen et al.

(10) Patent No.: US 10,727,895 B1
(45) Date of Patent: Jul. 28, 2020

(54) TRANSCEIVER CIRCUIT HAVING T-COIL, INDUCTIVE TERMINATION, AND EQUALIZATION

(71) Applicant: Apple Inc., Cupertino, CA (US)

(72) Inventors: Huy M. Nguyen, San Jose, CA (US); Cristian Gozzi, Santa Clara, CA (US); Huabo Chen, Saratoga, CA (US); Xuchen Zhang, Atlanta, GA (US); Yu Chang, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/585,431

(22) Filed: Sep. 27, 2019

(51) Int. Cl.
*H01L 27/08* (2006.01)
*H04B 1/44* (2006.01)
*H04L 25/03* (2006.01)
*H04B 1/401* (2015.01)

(52) U.S. Cl.
CPC ............... *H04B 1/44* (2013.01); *H04B 1/401* (2013.01); *H04L 25/03878* (2013.01)

(58) Field of Classification Search
None
See application file for complete search history.

(56) References Cited

U.S. PATENT DOCUMENTS

| | | | | |
|---|---|---|---|---|
| 7,969,256 B2* | 6/2011 | Otsuka | ............... | H04L 25/028 333/12 |
| 8,395,234 B2* | 3/2013 | Okushima | ........... | H01L 23/5227 257/531 |
| 8,786,048 B2* | 7/2014 | Okushima | ........... | H01L 23/5227 257/531 |
| 8,798,204 B2* | 8/2014 | Chen | ................... | H04L 25/0276 375/257 |
| 8,896,352 B2* | 11/2014 | Huang | .................. | H03H 11/44 327/108 |
| 9,130,535 B2* | 9/2015 | Lin | .......................... | H03H 7/38 |
| 9,401,706 B2 | 7/2016 | Tirunagari et al. | | |
| 9,602,314 B1* | 3/2017 | Chang | ............... | H04L 25/03019 |
| 9,621,136 B1* | 4/2017 | Chang | ................ | H03K 3/35613 |
| 9,806,915 B1* | 10/2017 | Elzeftawi | ........... | H04L 25/03885 |
| 9,934,176 B2* | 4/2018 | Wang | ................ | G06F 13/4072 |
| 10,530,615 B1* | 1/2020 | Hur | ...................... | H04B 1/0475 |
| 2008/0123771 A1* | 5/2008 | Cranford | ............ | H04L 25/0278 375/285 |
| 2019/0123551 A1 | 4/2019 | Yuan et al. | | |

* cited by examiner

*Primary Examiner* — Tuan A Tran
(74) *Attorney, Agent, or Firm* — Kowert, Hood, Munyon, Rankin & Goetzel, P.C.; Erik A. Heter

(57) ABSTRACT

A transceiver circuit having a T-coil circuit, inductive termination, and an equalization circuit is disclosed. The transceiver includes a transmitter having an output coupled to a first node, and a receiver having an input coupled to the first node. A T-coil circuit is coupled between the first node and an input/output (I/O) node. The T-coil circuit includes first and second inductors coupled in series between the first node and the I/O node, the inductors being coupled at a second node. A termination circuit is coupled between the first node and a reference node, the termination circuit including a third inductor. The transceiver circuit also includes an equalization circuit configured to convey an equalization signal to the second node.

20 Claims, 5 Drawing Sheets

TRANSCEIVER CIRCUIT HAVING T-COIL, INDUCTIVE TERMINATION, AND EQUALIZATION

BACKGROUND

Technical Field

The present disclosure is directed to electronic circuits, and more particularly, to transceiver circuits.

Description of the Related Art

In various types of communications systems, both hard-wired and wireless, communications channels may be uni-directional or bi-directional. When a communication channel is uni-directional, a transmitter may be coupled to one end of the channel, while a receiver is coupled to the other end. When a communications channel is bi-directional, transceivers may be coupled to both ends of the channel. Each transceiver is capable of transmitting and receiving data in order to enable two-way communications across the channel. Depending on the direction of the communications in progress, one of the transceivers acts as a transmitter, while the other acts as a receiver. To reverse the direction of communications, each of the transceivers switches its current operating mode to the opposite mode.

SUMMARY

A transceiver circuit having a T-coil circuit, inductive termination, and an equalization circuit is disclosed. In one embodiment, a transceiver includes a transmitter having an output coupled to a first node, and a receiver having an input coupled to the first node. A T-coil circuit is coupled between the first node and an input/output (I/O) node. The T-coil circuit includes first and second inductors coupled in series between the first node and the I/O node, the inductors being coupled at a second node. A termination circuit is coupled between the first node and a reference node, the termination circuit including a third inductor. The transceiver circuit also includes an equalization circuit configured to convey an equalization signal to the second node.

In one embodiment, the transceiver includes a control circuit. During operation in a transmit mode (e.g., when the transceiver is transmitting information), the control circuit activates the equalization circuit while disabling the termination circuit. The equalization circuit is coupled to the second node via a capacitor, which may be a metal-on-metal capacitor in one embodiment. During operation in a receive mode (e.g., when the transceiver is receiving information), the control circuit deactivates the equalization circuit, while enabling the termination circuit. When enabled, the termination circuit provides on-die termination for the signal path in the transceiver.

BRIEF DESCRIPTION OF THE DRAWINGS

The following detailed description makes reference to the accompanying drawings, which are now briefly described.

Figure 1:
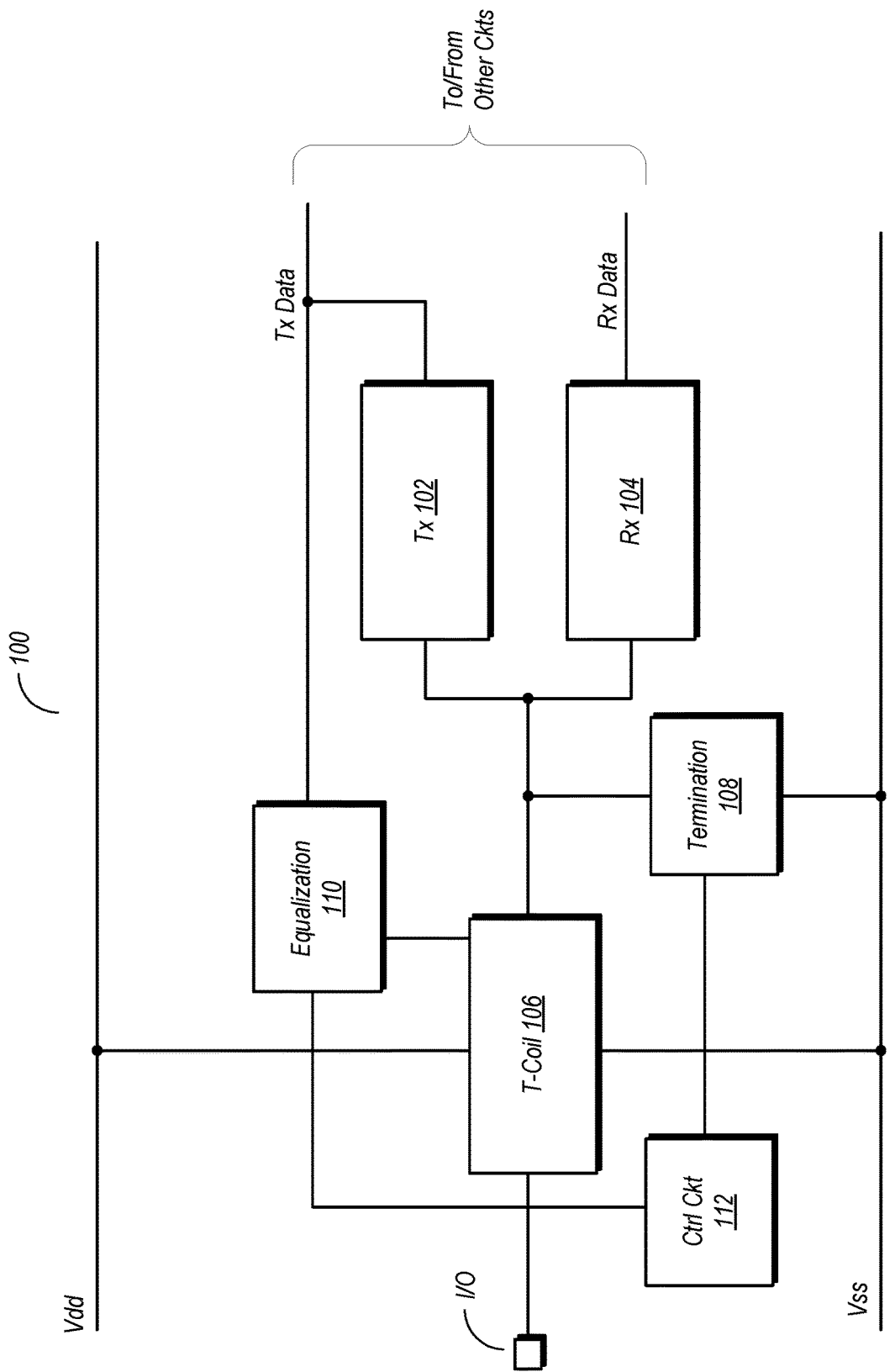
FIG. 1 is a block diagram of one embodiment of a transceiver circuit.

Although the embodiments disclosed herein are susceptible to various modifications and alternative forms, specific embodiments are shown by way of example in the drawings and are described herein in detail. It should be understood, however, that drawings and detailed description thereto are not intended to limit the scope of the claims to the particular forms disclosed. On the contrary, this application is intended to cover all modifications, equivalents and alternatives falling within the spirit and scope of the disclosure of the present application as defined by the appended claims.

This disclosure includes references to "one embodiment," "a particular embodiment," "some embodiments," "various embodiments," or "an embodiment." The appearances of the phrases "in one embodiment," "in a particular embodiment," "in some embodiments," "in various embodiments," or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality, of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

In the following description, numerous specific details are set forth to provide a thorough understanding of the disclosed embodiments. One having ordinary skill in the art, however, should recognize that aspects of disclosed embodiments might be practiced without these specific details. In some instances, well-known circuits, structures, signals, computer program instruction, and techniques have not been shown in detail to avoid obscuring the disclosed embodiments.

DETAILED DESCRIPTION OF EMBODIMENTS

The present disclosure is directed a transceiver circuit that includes one or more equalization circuits, a T-coil circuit, and inductive termination. In conventional transceiver circuits, capacitance from electro-static discharge (ESD) circuitry can put extra loading on a capacitor associated with an I/O pad/node. This may be alleviated somewhat by use of a T-coil circuit. Equalization circuitry may be provided to improve a transmit margin, but can add extra capacitive loading to an I/O pin, thereby reducing the margin for operations in either of a transmit mode or a receive mode. To disconnect the extra capacitive load from the output pad, one or more additional switches can be added between the equalization circuitry and the output pad. This can also add more to the parasitic capacitive load and contribute to weakness against ESD events.

The transceiver circuit of the present disclosure includes both a T-coil and equalization circuit. Additionally, the transceiver circuit also includes an inductive termination circuit. Various embodiments of the transceiver circuit disclosure herein may provide margin improvements for both voltage and timing. Furthermore, the replacement of some active components with passive components in may improve DC power consumption. This may also lead to improvements on the power distribution network with respect to switching power, noise, and signaling/supply reflection. Various embodiments of the transceiver circuit disclosed herein may be suitable for a variety of different packages and transmission channels (including channels of various lengths, from short to long), and is thus flexible for implementation in a number of different types of communications systems and interfaces.

FIG. 1 is a block diagram of one embodiment of a transceiver circuit. More particularly, FIG. 1 illustrates the basic components of a transceiver circuit in accordance with the present disclosure. In the embodiment shown, transceiver circuit includes a transmitter circuit 102 and a receiver circuit 104. The transceiver may thus operate in a transmit mode or a receive mode. When operating in the transmit mode, data may be transmitted from transmitter 102 to an input/output (I/O) pad/node, labeled here as 'I/O'. The transmitted signals may be conveyed through a T-coil circuit 106. When operating in the receive mode, incoming data may be received on the I/O node, conveyed through T-coil circuit 106, to an input of receiver 104. Both transmitter 102 and receiver 104 may be coupled to other circuits, such as a processor, controller, or other type of circuitry. Such circuitry may convey data (TxData) to transmitter 102 for transmission, and may receive incoming data (RxData) from receiver 104.

In addition to transmitter 102, the data for transmission may also be received by an equalization circuit 110. Equalization circuit 110 may include one or more circuits therein that generate equalization signals to be conveyed to T-coil circuit 106 when operating in the transmit mode. In one embodiment, equalization circuit 110 may perform pre-emphasis of digital signals to be transmitted. During operation in the receive mode, equalization circuit 110 may be inactive. Additional equalization (e.g., pre-emphasis, multi-tap pre/post cursor equalization, shunt equalization, etc.) may be performed using DC coupled equalization circuits within transmitter 102.

Termination circuit 108 in the embodiment shown provides on-die termination (ODT) during operations in the receive mode. An example of one possible arrangement of such a termination circuit is discussed in further detail below. Termination circuit 108 may be switchable such that it is enabled during operation in the receive mode and disabled during the transmit mode. In another embodiment, termination circuit 108 can also be utilized with transmitter 102 when operating in the transmit mode. Thus, in such an embodiment, termination circuit 108 may remain enabled in both the transmit and receive modes.

Control circuit 112 in the embodiment shown is used to control both termination circuit 108 and equalization circuit 110, as well as the various equalization modes that may be implemented within transmitter 102. During operation in the transmit mode, control circuit 112 may activate/enable equalization circuit 110 while disabling termination circuit 108. During operation in the receive mode, control circuit 112 may de-activate equalization circuit 110 and enable termination circuit 108. In some embodiments, both termination circuit 108 and equalization circuit 110 may be disabled/deactivated by control circuit 112 when transceiver circuit 100 is idle (e.g., neither transmitting nor receiving data).

Figure 2:
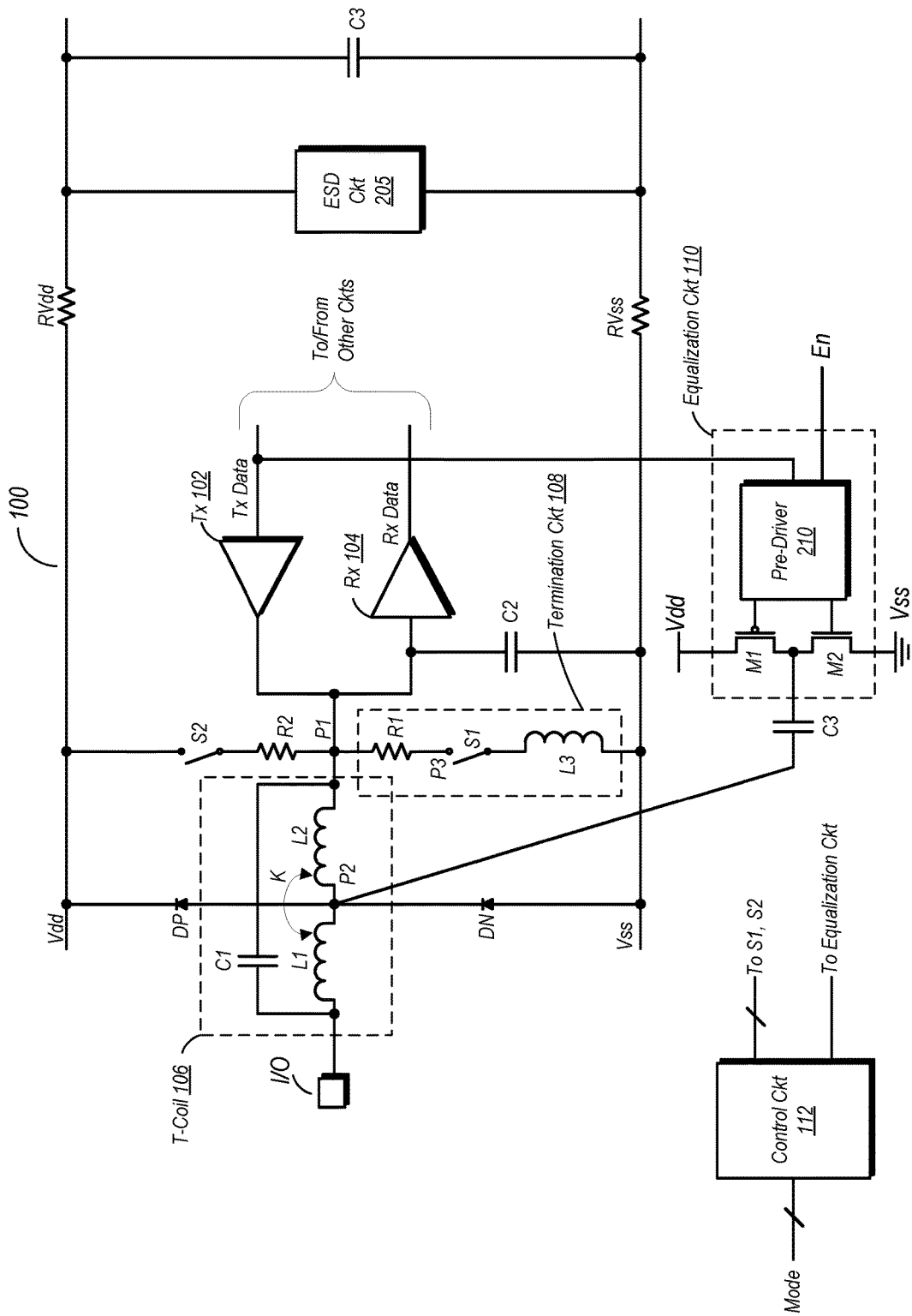
FIG. 2 is a schematic diagram of one embodiment of a transceiver circuit.

FIG. 2 is a schematic diagram of one embodiment of transceiver circuit 100. In the embodiment shown, transceiver circuit 100 illustrates additional details of the various components shown in FIG. 1, with some additional details not shown therein.

Transmitter 102 includes an output coupled to a first node P1, which is also coupled to an input of receiver 104. The signal path for both transmission and reception of data is through T-coil 106 to the I/O pad. Similarly, receiver 104 also includes an input coupled to P1. Thus, when transceiver 100 operating in the transmit mode, data is transmitted from the output of transmitter 102, onto P1, through T-coil 106, to the I/O pad. When transceiver 100 is operating in the receive mode, data is conveyed from the I/O pad, through T-coil 106, to node P1 to the input of receiver 104.

T-coil circuit 106 in the embodiment shown includes inductors L1 and L2, which are connected at a second node, P2. T-coil 106 also includes capacitor C1, coupled between P1 and the I/O pad. ESD diodes DP and DN are also coupled to P2 by their anode and cathode, respectively. The anode of DN is coupled to the reference node, Vss, while the cathode of DP, is coupled to the supply voltage node Vdd. Diodes DP and DN may also provide noise isolation, as noise seen on P2 is effectively isolated from circuitry external to T-coil 106, including on supply voltage node Vdd and reference node Vss.

Capacitor C1 in the embodiment shown is a feed-forward capacitor. In particular, high-frequency signals (or high frequency components of data) may pass between P1 and the I/O node through C1. More generally, C1 provides a low impedance path at high frequency. The value of capacitor C1 may thus be selected based on the frequency desired in the feed-forward path.

Inductors L1 and L2 may have a coupling factor that is selected for the particular application. The two coils, which may be intertwining when implemented on an IC, have a coupling factor K. Current flowing into one of inductors L1 and L2 may be electromagnetically coupled to the other one of inductors L1 and L2.

Equalization circuit 110 in this particular embodiment includes a pre-driver circuit 210, a pull-up transistor M1, and a pull-down transistor M2. Pre-driver 210 includes a first input coupled to receive data to be transmitted (TxData, also receive by transmitter 102), and an enable signal, En, which is received from control circuit 112. Depending on the received data, pre-driver circuit 210 may activate one of transistors M1 or M2, to generate an equalization signal. This signal is conveyed through capacitor C3, which is a metal-on-metal capacitor, in one embodiment, that provides AC coupling of equalization circuit 110 to P2. The use of a metal-on-metal capacitor may be advantageous in that it may lack any physical parasitic characteristics (e.g., no parasitic diodes, less temperature coefficient, and better ESD robustness). One terminal of capacitor C3 is coupled to the junction of M1 and M2, while the other terminal is coupled to P2. It is notable that, in contrast to previous embodiments, equalization circuit 110 is not coupled to node P2 of T-coil 106 by a switch. Capacitor C3 provides both ESD protection and isolation between equalization circuit 110 and node P2 when the former is not active or conveying equalization signals. The absence of a switch in the embodiment shown may also minimize switching noise produced by transceiver 100. When the equalization circuit 110 is not active (e.g., when both M1 and M2 are turned off), a high impedance state may be entered, and thus capacitive loading may be reduced.

It is noted that the timing of the generation and transmission of equalization signals to node P2 may be timed in order to account for inherent delays in the signal path through T-coil 106. The equalization signal timing may be on time (arriving at same time as the signal from the transmitter), early, or delayed, depending on the specific implementation. Further, equalization circuit 110 may include multiple sub-circuits that can adjust for a different strength of equalization. In some embodiment, a calibration circuit may also be included to calibrate for the strength of the signal(s) provided from equalization circuit 110. Furthermore, in embodiments having multiple sub-circuits, the arrival times at P2 may be staggered in some instances. The settings may be determine per individual bit within a byte/channel.

Termination circuit 108 in the embodiment shown includes a third inductor, L3, a switch S1, and a resistor R1. Inductor L3 is coupled between the reference node Vss and switch S1. The other terminal of switch S1 is coupled to node P3, which is in turn coupled to one terminal of R1. The other terminal of R1 is coupled to node P1. Termination circuit 108 may be enabled, by a corresponding control signal from control circuit 112, during operation in the receive mode. Enabling of termination circuit 108 may be performed by closing switch S1. Input capacitor C2 is represents a non-intentional load capacitance (rather than an intentionally implemented capacitor) that is in parallel with termination circuit 108, and may be charged when switch S1 is closed to enable termination circuit 108, before the on-die termination (ODT) is fully formed. Inductor L3, when termination circuit 108 is enabled, may briefly form an open circuit that allows C2 to charge before completing the ODT. In one embodiment, the ODT may have a higher impedance value (e.g., 60 ohms, vs. previous embodiments in which the ODT has an impedance value of, e.g., 34/48 ohms). This may provide significant power savings during operation in the receive mode.

Transceiver 100 also includes another resistor R2 and switch S2 that are coupled between P1 and the supply voltage node, Vdd. Switch S2 may be closed during operation in the receive mode. These components may be utilized when a particular type of signaling calls for termination to Vdd, while R1 and S1 are utilized when the type of signaling calls for termination to Vdd/2.

Transceiver circuit 100 in the embodiment shown also includes an ESD circuit 205 and a decoupling capacitor C3. ESD circuit 205 is coupled to resistor RVdd (the other terminal of which is coupled to supply voltage node Vdd) and resistor RVss (the other terminal of which is coupled to reference node Vss). In the occurrence of an ESD event in the vicinity of transceiver 100, ESD circuit 205 may provide a safe discharge path to prevent damage to other nearby circuits. In the embodiment shown, RVdd and RVss may be minimized, as smaller resistance may be more effective for ESD protection. This may allow the ESD circuit 205 to be more effective in handling ESD events.

Control circuit 112 in the embodiment shown is coupled to receive one or more mode signals indicative of whether transceiver 100 is to operate in the transmit mode, the receive mode, or is otherwise idle. Depending on the mode of operation, control circuit 112 may cause enabling of the termination circuit 108 (when in receive mode) or the activation of equalization circuit 110 (when in the transmit mode). When in the transmit mode, control circuit 112 may cause termination circuit 108 to be disabled by opening switch S1. When in the receive mode, control circuit 112 may cause de-activation of equalization circuit 110 by de-assertion of the enable signal, En.

Figure 3:
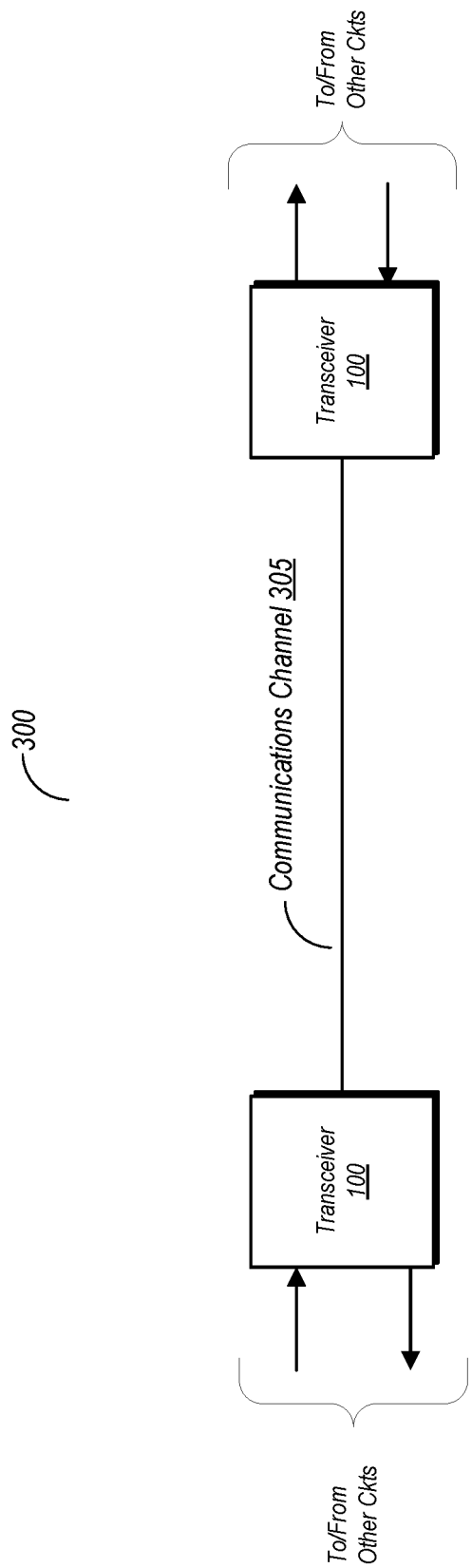
FIG. 3 block diagram of one embodiment of a communications system having transceivers coupled to a communications channel.

FIG. 3 block diagram of one embodiment of a communications system (or part thereof) having transceivers coupled to a communications channel. In the embodiment shown, system 300 is a communications system having at least one bi-directional communications channel 305. Transceivers 100 may be coupled to each end of communications channel. During operation, and depending on the direction of data flow, one of transceivers 100 may operate in the transmit mode, while the other transceiver operates in the receive mode. Changing of the direction of data flow may be accomplished by changing the mode of operation of both transceivers 100 in the system.

Communications system 300 may be one of a number of different types of systems in which data is exchanged between transceivers. For example, communications channel 305 may be one line of a data bus in a memory subsystem, with one transceiver 100 implemented in, e.g., a memory controller, while the other transceiver is implemented in the memory itself. Other possible examples of a communications system 300 falling within the scope of this disclosure include other types of wired communications system (e.g., network interfaces) as well as wireless communications system (e.g., WiFi or other systems).

It is noted that communications system 300 shown here is a simplified diagram provided for illustrative purposes, but is not intended to be limiting. Other components (e.g., antennas, amplifiers, etc.) may be included in various embodiments while still falling within the general scope of what is illustrated herein.

Figure 4:
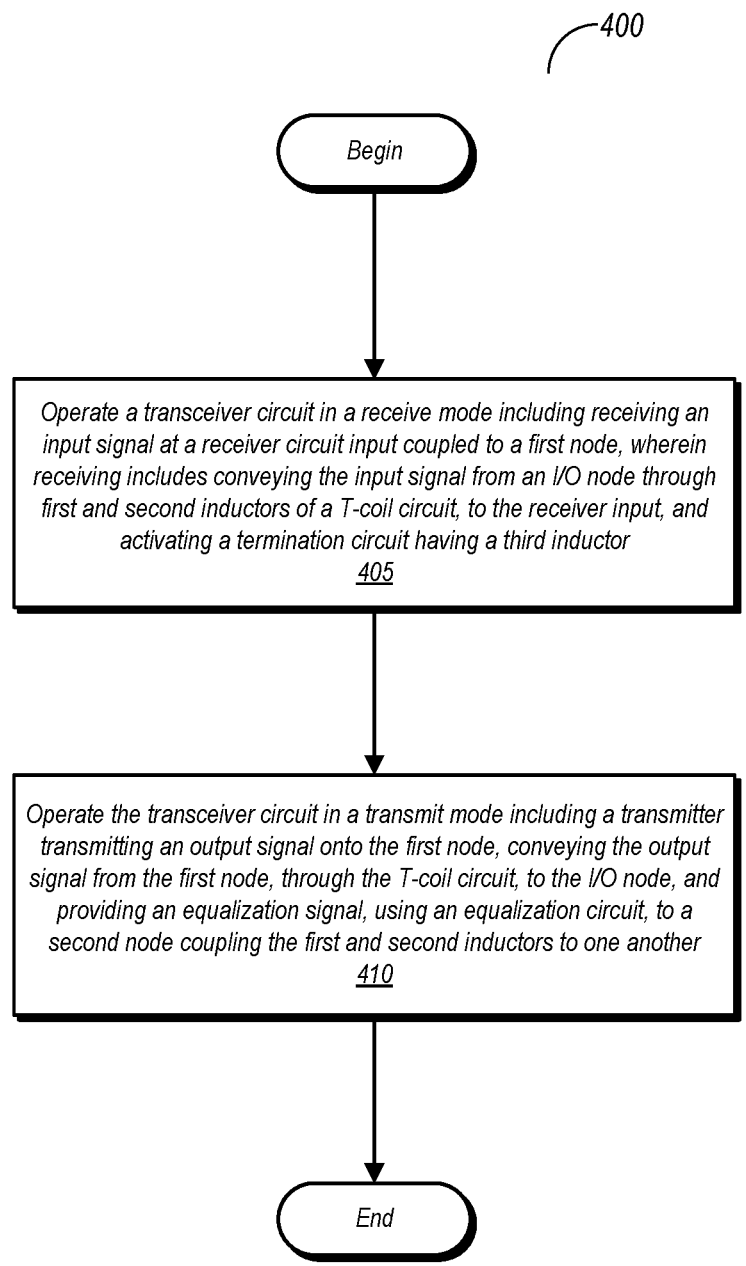
FIG. 4 is a flow diagram illustrating one embodiment of a method for operating a transceiver.

FIG. 4 is a flow diagram illustrating one embodiment of a method for operating a transceiver. Method 400 may be performed using various embodiments of a transceiver circuit discussed above in reference to FIGS. 1-3. Embodiments of a transceiver capable of carrying out Method 400 but not explicitly discussed herein may also fall within the scope of this disclosure.

Method 400 begins with operating a transceiver circuit in a receive mode, wherein operating in the receive mode (block 405). Operating the transceiver in the receive mode includes receiving an input signal at a receiver circuit input coupled to a first node, wherein receiving the input signal includes conveying the input signal from an input/output (I/O) node, through first and second inductors of a T-coil circuit, to the receiver input and activating a termination circuit having a third inductor. Method 400 further includes operating the transceiver circuit in a transmit mode (block 410). Operating in the transmit mode includes a transmitter transmitting an output signal onto the first node, conveying the output signal from the first node, through the T-coil circuit, to the I/O node and providing an equalization signal, using an equalization circuit, to a second node, the second node coupling the first and second inductors to one another.

In various embodiments, the method may include enabling, using a control circuit, the termination circuit during operation in the receive mode and disabling, using the control circuit, the termination circuit during operation in the transmit mode. The method may further include activating, using the control circuit, the equalization circuit during operation in the transmit mode, and deactivating, using the control circuit, the equalization circuit during operation in the receive mode.

Activating the termination circuit includes closing a switch coupled between the third inductor and a termination resistor, wherein the termination resistor is further coupled to the first node, and wherein the third inductor is coupled between the switch and a reference node.

The equalization circuit generates the equalization signal, and in various embodiments, conveys the equalization signal, through a metal-on-metal capacitor, to the second node. The method further includes, when operating in the transmit mode, providing data values to each of the transmitter and the equalization circuit, transmitting the data values from the transmitter circuit onto the first node and transmitting the equalization signal, based on the data values, concurrent with transmitting the data values from the transmitter circuit.

Figure 5:
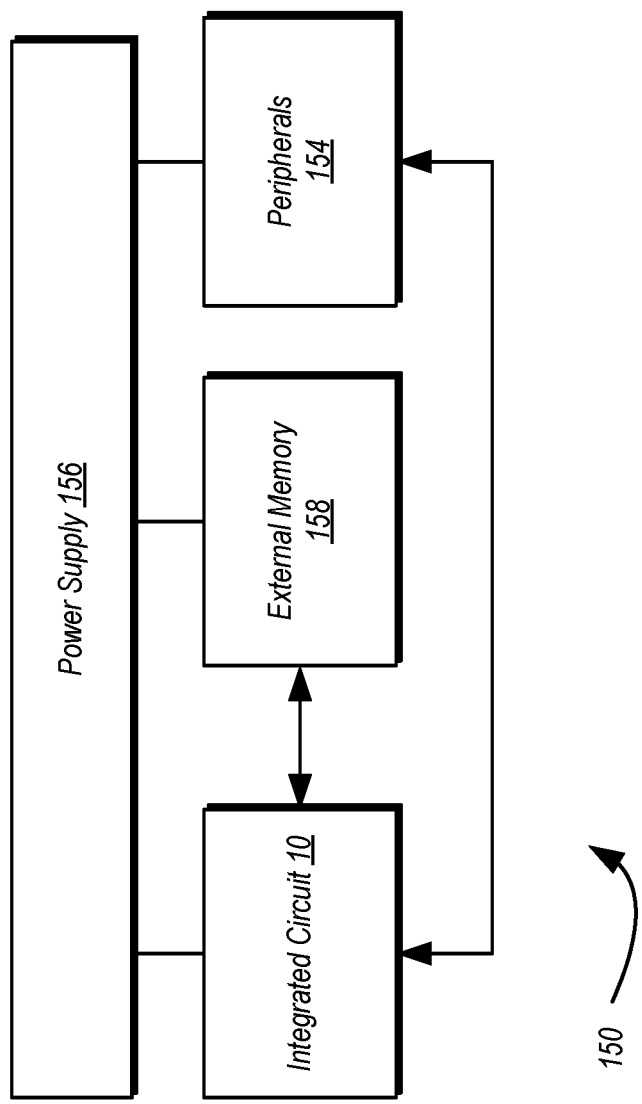
FIG. 5 is a block diagram of one embodiment of an example system.

Turning next to FIG. 5, a block diagram of one embodiment of a system 150 is shown. In the illustrated embodiment, the system 150 includes at least one instance of an integrated circuit 10 coupled to external memory 158. The integrated circuit 10 may include a memory controller that is coupled to the external memory 158. The integrated circuit 10 is coupled to one or more peripherals 154 and the external memory 158. A power supply 156 is also provided which supplies the supply voltages to the integrated circuit 10 as well as one or more supply voltages to the memory 158 and/or the peripherals 154. In some embodiments, more than one instance of the integrated circuit 10 may be included (and more than one external memory 158 may be included as well).

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as WiFi, Bluetooth, cellular, global positioning system, etc. The peripherals 154 may also include additional storage, including RAM storage, solid-state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, tablet, etc.).

The external memory 158 may include any type of memory. For example, the external memory 158 may be SRAM, dynamic RAM (DRAM) such as synchronous DRAM (SDRAM), double data rate (DDR, DDR2, DDR3, LPDDR1, LPDDR2, DDR1-5, LPDDR1-5, etc.) SDRAM, RAMBUS DRAM, etc. The external memory 158 may include one or more memory modules to which the memory devices are mounted, such as single inline memory modules (SIMMs), dual inline memory modules (DIMMs), etc.

In various embodiments, one or more instances of a transceiver circuit discussed above may be implemented in system 150. For example, a memory controller (e.g., implemented in integrated circuit 10) and memory 158 may each include a number of transceivers as described above that implement a memory interface. Other implementations of such transceivers may also be included in, e.g., peripherals 154 or elsewhere in system 150.

Numerous variations and modifications will become apparent to those skilled in the art once the above disclosure is fully appreciated. It is intended that the following claims be interpreted to embrace all such variations and modifications.

What is claimed is:

1. A circuit comprising:
 a transmitter circuit configured to transmit an output signal via a first node;
 a receiver circuit coupled to receive an input signal via the first node;
 a T-coil circuit coupled between the first node and an input/output (I/O) node, the T-coil circuit including a first inductor coupled between the first node and a second node and a second inductor coupled between the second node and the I/O node;
 a termination circuit coupled between the first node and a reference node, the termination circuit including a third inductor; and
 an equalization circuit configured to equalize a transmitted signal on the second node.

2. The circuit of claim 1, wherein the T-coil circuit includes a capacitor coupled between the I/O node and the first node.

3. The circuit of claim 1, wherein the termination circuit includes:
a termination resistor having a first terminal coupled to the first node;
a switch coupled to a second terminal of the termination resistor; and
an inductor coupled between the switch and the reference node.

4. The circuit of claim 1, further comprising a metal-on-metal capacitor coupled between an output of the equalization circuit and the second node.

5. The circuit of claim 4, where the equalization circuit includes a pre-driver circuit coupled to receive data that is also conveyed to the transmitter, a pull-up transistor coupled between the output of the equalization circuit and a voltage supply node, and a pull-down transistor coupled between the output of the equalization circuit and the reference node.

6. The circuit of claim 5, wherein the equalization circuit is active when the circuit operating in a transmit mode and inactive when the circuit is operating in a receive mode.

7. The circuit of claim 1, further comprising an input capacitor coupled between the first node and the reference node.

8. The circuit of claim 1, further comprising:
a first diode coupled between the second node and a voltage supply node; and
a second diode coupled between the second node and the reference node.

9. The circuit of claim 1, further comprising a control circuit configured to, during a receive mode, enable the termination circuit and disable the equalization circuit, and further configured to, during a transmit mode, disable the termination circuit an enable the equalization circuit.

10. A method comprising:
operating a transceiver circuit in a receive mode, wherein operating in the receive mode includes:
receiving an input signal at a receiver circuit input coupled to a first node, wherein receiving the input signal includes conveying the input signal from an input/output (I/O) node, through first and second inductors of a T-coil circuit, to the receiver input; and
activating a termination circuit having a third inductor;
operating the transceiver circuit in a transmit mode, wherein operating in the transmit mode includes:
a transmitter transmitting an output signal onto the first node;
conveying the output signal from the first node, through the T-coil circuit, to the I/O node; and
providing an equalization signal, using an equalization circuit, to a second node, the second node coupling the first and second inductors to one another.

11. The method of claim 10, further comprising:
enabling, using a control circuit, the termination circuit during operation in the receive mode;
disabling, using the control circuit, the termination circuit during operation in the transmit mode;
activating, using the control circuit, the equalization circuit during operation in the transmit mode; and
deactivating, using the control circuit, the equalization circuit during operation in the receive mode.

12. The method of claim 10, wherein activating the termination circuit includes closing a switch coupled between the third inductor and a termination resistor, wherein the termination resistor is further coupled to the first node, and wherein the third inductor is coupled between the switch and a reference node.

13. The method of claim 10, wherein providing the equalization signal comprises:
the equalization circuit generating the equalization signal; and
conveying the equalization signal, through a metal-on-metal capacitor, to the second node.

14. The method of claim 10, wherein operating in the transmit mode further comprises:
providing data values to each of the transmitter and the equalization circuit;
transmitting the data values from the transmitter onto the first node;
transmitting the equalization signal, based on the data values, concurrent with transmitting the data values from the transmitter.

15. A system comprising:
a bi-directional communications channel; and
a transceiver circuit configured to transmit signals into the communications channel and receive signals from the communications channel, the transceiver circuit comprising:
a transmitter circuit configured to transmit an output signal via a first node;
a receiver circuit coupled to receive an input signal via the first node;
a T-coil circuit coupled between the first node and an input/output (I/O) node of the communications channel, the T-coil circuit including a first inductor coupled between the first node and a second node and a second inductor coupled between the second node and the I/O node;
a termination circuit coupled between the first node and a reference node, the termination circuit including a third inductor; and
an equalization circuit configured to equalize a transmitted signal on the second node.

16. The system of claim 15, wherein the transceiver is coupled to a first end of the communications channel, and wherein the system further includes a second transceiver coupled to a second end of the communications channel.

17. The system of claim 15, further comprising a control circuit configured to, during a receive mode, enable the termination circuit and disable the equalization circuit, and further configured to, during a transmit mode, disable the termination circuit an enable the equalization circuit.

18. The system of claim 15, wherein the termination circuit includes wherein the T-coil circuit includes a capacitor coupled between the I/O node and the first node, and wherein the transceiver circuit further includes a first diode coupled between the second node and a voltage supply node and a second diode coupled between the second node and the reference node.

19. The system of claim 15, where the equalization circuit includes a pre-driver circuit coupled to receive data that is also conveyed to the transmitter, a pull-up transistor coupled between an output of the equalization circuit and a voltage supply node, and a pull-down transistor coupled between the output of the equalization circuit and the reference node, and wherein the transceiver further includes a metal-on-metal capacitor coupled between the output of the equalization circuit and the second node.

20. The system of claim 15, wherein the termination circuit includes:

a termination resistor having a first terminal coupled to the first node;

a switch coupled to a second terminal of the termination resistor; and an inductor coupled between the switch and the reference node.

* * * * *